(12) United States Patent
Marathe et al.

(10) Patent No.: US 8,935,710 B1
(45) Date of Patent: Jan. 13, 2015

(54) UNIQUE EVENT IDENTIFICATION

(71) Applicant: Amazon Technologies, Inc., Reno, NV (US)

(72) Inventors: Sandeep Chidambara Marathe, San Jose, CA (US); Nadim Awad, San Francisco, CA (US); Vidhyananth Ramasamy Venkatasamy, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/089,632

(22) Filed: Nov. 25, 2013

(51) Int. Cl.
*G06F 13/00* (2006.01)
*G06F 9/54* (2006.01)
(52) U.S. Cl.
CPC ..................................... *G06F 9/542* (2013.01)
USPC .......................................... 719/318; 710/260

(58) Field of Classification Search
CPC .................................. G06F 9/542; G06F 13/24
USPC .......................................... 719/318; 710/260
See application file for complete search history.

(56) References Cited

U.S. PATENT DOCUMENTS

| 6,378,004 B1 * | 4/2002 | Galloway et al. ............. 719/321 |
| 2004/0162061 A1 * | 8/2004 | Abrol et al. ................ 455/414.1 |

* cited by examiner

*Primary Examiner* — Andy Ho
(74) *Attorney, Agent, or Firm* — Schwabe Williamson & Wyatt PC

(57) ABSTRACT

Embodiments of methods, systems and storage medium associated with generating and storing a unique event identifier (UEID) associated with a type of an event of a module of a computing system are disclosed herein. Specifically, a centralized UEID storage may include one or more event nodes configured to associate a UEID with a type of an event handled by or occurring at an owner module. The centralized UEID storage may be further configured to associate, using the UEID, the type of the event with one or more callback functions of one or more client modules. Upon occurrence of the type of the event, the callback functions may be identified and invoked using the UEID.

20 Claims, 7 Drawing Sheets

| Event Module | IRQ# / SW EVT # | Module Events / Unique Bit Position | UEID |
|---|---|---|---|
| Charger | 0x000_150_00 | Connect / Disconnect -- 0x01 | 0x15001 |
| | | Charge Error / Details -- 0x02 | 0x15002 |
| | | Battery Read Error -- 0x04 | 0x15004 |
| Fuel Gauge | 0x000_0C0_00 | Maximum Voltage -- 0x01 | 0xC001 |
| | | Minimum Voltage -- 0x02 | 0xC002 |
| | | Maximum Temperature -- 0x08 | 0xC008 |
| | | Minimum Temperature -- 0x0F | 0xC00F |
| Power Management Integrated Controller - Top | 0x000_049_00 | Power Button Press -- 0x02 | 0x4902 |
| | | Power Button Release -- 0x04 | 0x4904 |
| | | Low Battery Warning -- 0x0A | 0x490A |
| | | Critical Battery Warning -- 0x0B | 0x490B |
| Display Regulator | 0x000_00A_00 | Electronic Paper Display Power Up -- 0x01 | 0xA01 |
| | | Electronic Paper Display Power Down -- 0x02 | 0xA02 |
| | | Electronic Paper Display Regulator Fault -- 0x03 | 0xA03 |
| Software | 0xEA0_000_00 | Software Restart -- 0x02 | 0xEA000002 |
| | | Software Shutdown -- 0x04 | 0xEA000004 |
| | | Power Management Integrated Controller Initialization Done -- 0x08 | 0xEA000008 |

UNIQUE EVENT IDENTIFICATION

BACKGROUND

An event may serve as a triggering mechanism to an application processor (AP). In other words, the event may be a way for a module, piece of software, hardware, firmware or some other element of a computing system to seek the attention of, or an action by, the AP. Some events may be asynchronous, that is occurring independently of the main program flow. Such events may be related, for example, to hardware interrupts. Alternatively, some events may be synchronous, that is the event occurs as part of the main program flow and occurrence of the event may temporarily pause or halt the program flow. Synchronous events may be related, for example, to software triggered read/write register access.

Modern computing systems, such as embedded systems, may have complex subsystems and multiple hardware driver components causing various types of events. Such types of events may include events like a display being powered on, a network packet being received, a notification of a system shutdown, and so forth. Within such complex systems, it may be difficult to organize and track occurrences of different types of events in the systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2 is an example of different UEIDs and how a UEID may be generated, in accordance with various embodiments.

DETAILED DESCRIPTION

Techniques described herein provide for the generation and use of unique event identifiers (UEIDs) which may be associated with events of one or more logical modules of a computing system. Specifically, each logical module in a computing system, which may correspond for example to a hardware driver or some other type of logical module, may handle one or more types of events. An event may correspond, for example, to an action performed on or an action performed by an element of hardware of the computing device. For example, a type of an event may be related to an action such as a user clicking a mouse button, a user releasing a mouse button, a power up of a display screen, a connection of a charger or some other type of action. In embodiments, each logical module may be configured to generate a UEID for a type of an event that is unique system-wide for all events of all logical modules. The UEIDs may be generated, based, for example, on one or more of a software event number of the logical module, an interrupt request (IRQ) number of the logical module and/or a position allocated to the type of the event in an event registry of the logical module (hereinafter, simply module).

The UEIDs may then be associated with the types of events, and the association may be stored in a centralized UEID storage. The centralized UEID storage may include one or more event nodes that contain entries, for example, for the types of events and the corresponding UEIDs. The event nodes may have additional entries such as entries for flag masks associated with the type of the event, interfaces of the types of the event and/or callback functions associated with the type of the event as described in further detail below. When an event occurs, the occurrence of the event may be easily tracked using the UEID. This tracking may be useful in a programming or troubleshooting context, a user context or a system context to invoke one or more callback functions associated with the type of the event based at least in part on the occurrence of the event.

Figure 1:
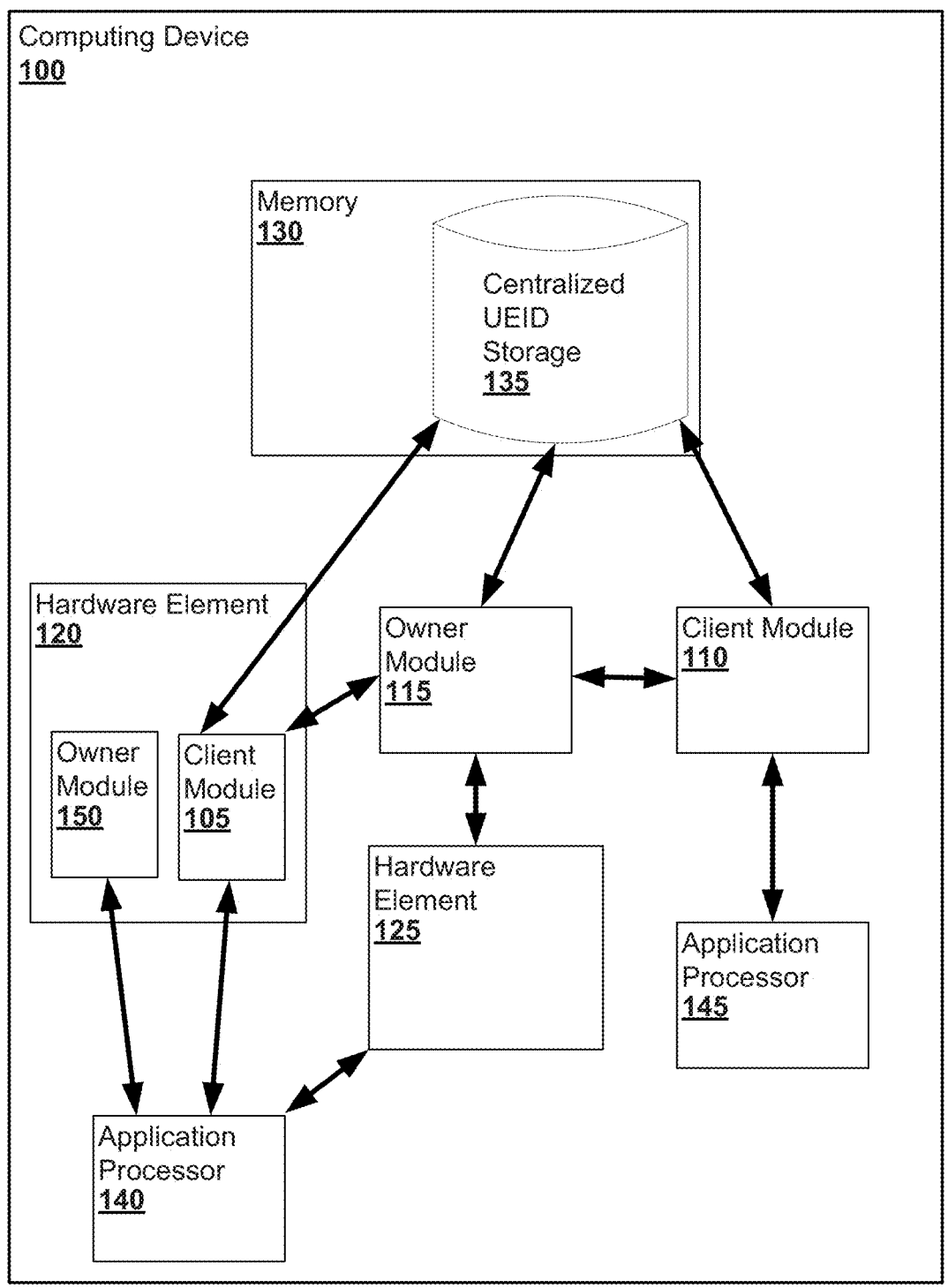
FIG. 1 is a block diagram illustrating an example computing device configured to generate and use unique event identifiers (UEIDs), in accordance with various embodiments.

FIG. 1 depicts an example computing device 100, which may be configured to generate, store, and use one or more UEIDs, in accordance with various embodiments. As will be described in greater detail below, a UEID may be a system-wide unique identifier for a specific type of event of a module of the computing device 100. Each UEID may be different than another UEID of the computing device 100, and therefore a UEID may be considered to be a unique pointer to, or identifier of, a specific type of event.

The computing device 100 may include one or more modules such as client modules 105 and 110, and owner modules 115 or 150. In embodiments, a module such as client modules 105 or 110, or owner modules 115 or 150, may be a logical element associated with or controller of a piece of hardware, such as a driver of the hardware. For example, the module may perform all of the communication and logic functions of the hardware. Specifically, a module may be a part of a hardware element, such as client module 105 or owner module 150 which are shown in FIG. 1 as coupled with hardware element 120. Alternatively, a module may be separate from, but coupled with a hardware element, such as owner module 115 which is shown coupled with hardware element 125. Alternatively, a module such as client module 110 may not be directly coupled with a specific hardware element. In some embodiments, a module may be implemented as logic in hardware, firmware or software. In some cases a module, for example a client module 110, may be distributed and implemented as a plurality of modules in the computing device 100.

Each module may be responsible for handling one or more events. As described above, an event may be considered to be a mechanism by which a module may trigger action by, or seek the attention of, an application processor (AP) such as APs 140 or 145. An owner module such as owner module 115 may be a module that is primarily responsible for handling an event. That is, when the action related to the event is performed, the event may be triggered or said to occur. The owner module 115 may then subsequently handle the event, for example by performing some additional action in response to the occurrence of the event. Client modules 105 and 110 may be modules that are configured to perform one or more actions in response to the occurrence of an event based on a notification provided by the owner module 115. In other words, when the event occurs, the owner module 115 may handle the event and send a notification to client modules 105 or 110 which may in turn perform one or more additional other actions based on the occurrence of the event.

A client module 105 or 110 may monitor for the handling of an event by the owner module 115 through the use of a callback function. A callback function may be a mechanism through which a client module 105 or 110 may subscribe to a type of an event of the owner module 115. Specifically, when the type of event is handled by the owner module 115, then the owner module 115 may invoke or execute the callback function. The callback function may be a function of a client module 105 or 110, and the owner module 115 may notify the client module 105 or 110 when the type of event is handled by the owner module 115. The client module 105 or 110 may then execute the callback function in response to this notification from the owner module 115. Alternatively, the owner module 115 may perform the callback function of the client module 105 or 110 when the type of event occurs. Alternatively, the callback function may be a function of a third party hardware, software or firmware element that is identified by the client module 105 or 110, so that the owner module 115 performs the callback function when the type of event occurs. Because one or more functions of the client modules 105 and 110 may be reliant upon an event being handled by the owner module 115, the owner module 115 and client modules 105 and 110 may be communicatively coupled with one another, as shown in FIG. 1.

The computing device 100 may further include a memory 130, which may be a volatile or non-volatile memory. The memory 130 may, for example, include NAND (flash) memory, read only memory (ROM), random access memory (RAM), dynamic random access memory (DRAM), a hard disk drive (HDD) or some other type of memory.

The memory 130 may include a centralized UEID storage 135. The centralized UEID storage 135 may be configured to store one or more event nodes, each event node corresponding to a different type of event. Specifically, each event node may have an entry for a UEID of a type of an event, an identifier or name of the type of event, one or more callback functions associated with the type of event, a flag mask and/or an interface associated with the type of event. Other event nodes may have more or less entries in other embodiments. The event nodes may be indexed according to the UEIDs or according to some other indexing or searching heuristic or algorithm. Similarly, the centralized UEID storage 135 may be configured to associate one or more callbacks of the different client modules 105 and 110 with a type of an event handled by the owner module 115 by associating a callback with the event node of the type of the event. As will be described later, some event nodes may be associated with multiple callback functions. Additionally or alternatively, as described later, each event node may also have one or more interfaces and one or more flag masks. The centralized UEID storage 135 may be a database, a link list, a hash table, a binary tree, a radix tree or some other data structure configured to store one or more event nodes related to UEIDs, callbacks and types of events handled by or associated with the different modules 105, 110 and 115. In some cases, the information in the centralized UEID storage 135 may be stored or indexed according to the different UEIDs.

FIG. 2 depicts a chart 200 showing examples of one or more UEIDs, in accordance with various embodiments. As shown in FIG. 2, an event module, which may be similar to a client module 105 or 110 or an owner module 115, may have a single IRQ number or software event number. The IRQ number or software event numbers may be statically predefined numbers, for example predefined or preprogrammed by a programmer of the software logic module or a designer of the hardware element that the module is associated with. Alternatively, the IRQ number or software event numbers may be dynamically identified or assigned by a processor of the computing device as the module is executed. As noted above, each of the modules 105, 110 and 115 may handle one or more types of events. Each types of event may be assigned or allocated a specific position in an event registry of the module. Specifically, each module may have an event registry including one or more bits, which may otherwise be described as a bit registry. Each types of event handled by that module may be associated with a bit in that event registry. If that type of event is handled by the module, then the value of the bit associated with that type of event in the event registry may be changed. For example, a first type of event may be associated with a first bit position of an event registry of a module, a second type of event may be associated with a second bit position and so on. When the first type of event is handled by the module, then the value of the first bit position may be changed, for example from a value of 0 to a value of 1, to indicate that the type of event is occurring or has occurred. An event registry may be static and the bit positions for each type of event may be predefined, or an event registry may be dynamic and the bit positions are assigned as one or more types of events handled by the module are identified. An event registry may be stored in a memory such as memory 130, or the event registry may be stored in a different memory of the computing device or one or more external hardware peripherals (not shown). In other embodiments, a module such as modules 105, 110 or 115 may only include a single software event number, IRQ number and/or type of event.

As shown in FIG. 2, an event module may be a charger module that is related to functions of a charging port or charging element of a computing device such as computing device 100. The charger event module may, for example, be assigned an IRQ number of 0x000_150_00. The charger module may have types of events related to one or more actions of charging port or charging element such as a connect/disconnect event, a charge error/details event or a battery read error event. Each of the types of events handled by the module may have a distinct bit position in an event registry associated with the charger module. For example, information associated with the connect/disconnect event may be stored in a first bit position of the event registry, information associated with the charge error/details event may be stored in the second bit position of the event registry, information associated with the battery read error event may be stored in the fourth bit position of the event registry and so forth.

Each of the types of events may then have a UEID associated with the type of event that is based on both the IRQ/software event number of the module and the unique bit position of the event registry of the module. For example, the UEID of the connect/disconnect event may be 0x15001, which may be a combination of the IRQ/software event number and the unique bit position of the event in the event registry of the module. Similarly, the charge error/details event may have a UEID of 0x15002, and the battery read error may have a UEID of 0x15004. Other examples of event modules, IRQ/software events numbers, module events and UEIDs are shown in the chart 200 of FIG. 2.

As can be seen in the chart 200 of FIG. 2, the UEID may be a sequential value made up of two portions of the UEID in sequence. The first portion of the UEID may be the IRQ/software event number of the module, and the second portion of the UEID may be the unique bit position of the type of event in the event registry of the module. In some cases, leading zeroes of one or more of the two portions may be left off. For example, for the charge module, the IRQ/software event number of the module may be 0x000_150_00. However, the inclusion of the leading zeroes "0x000" in the UEID may be irrelevant or mathematically identical to a UEID that does not have the leading zeroes.

As shown above, one or both of the software event number and the IRQ number may be included as a first portion of the UEID. In some embodiments the UEID may be 32 bits long, and the software event number and the IRQ number may each be 12 bits long. The unique bit position of the type of event in the module event registry may be the last eight bits of the UEID. In other embodiments, the UEID may be more or less bits than 32 bits such as 16 bits, 24 bits, 64 bits or some other number of bits long.

In other embodiments, the UEID may be constituted in a different manner. For example, the UEID may consist of different fields depending on the specific module and/or type of event. For modules that only handle a single asynchronous interrupt type of event, the UEID may only comprise the IRQ number of the module, because an event registry for the single type of event may be un-necessary. For embodiments where the module includes multiple asynchronous shared IRQs, the UEID of the type of event may be the IRQ number of the owner module combined with the bit position of the type of event in the module event registry. For synchronous software defined types of events, the UEID may be a statically defined unique integer that can be chosen either by a programmer or the computing device to not conflict with one or more IRQs of one or more modules of the computing device.

Figure 3:
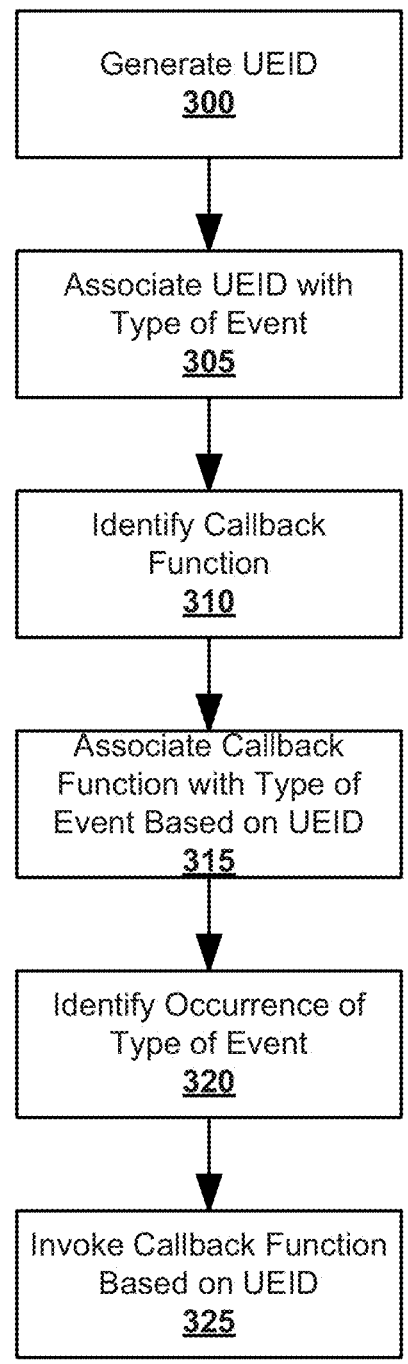
FIG. 3 is a process flow diagram illustrating a process for generating UEIDs and using a UEID to associate a callback function with a type of an event, in accordance with various embodiments.

FIG. 3 depicts an example process for how one or more UEIDs may be used, in accordance with various embodiments. As described above, a UEID may be used to unique identify a specific type of event system-wide. The UEID may be associated with the type of event in an event node of a centralized database, and one or more callback functions may further be associated with the type of event using the UEID. In the process described herein, the UEID and the type of event will be described as associated with a type of event handled by an owner module such as owner module 115 described with respect to FIG. 1. However, one or more additional UEIDs of types of events handled by a client module such as client modules 105 and 110 may be generated or indexed concurrently or sequentially with the generation and indexing of the type of event of the owner module.

Initially, a UEID of a type of an event handled by an owner module may be generated at 300. The UEID may be generated by the owner module, or by one or more processors of a computing device such as computing device 100. The UEID may include a software event number, IRQ number and/or unique bit position of the type of the event in an event registry of the owner module, as described above.

The generated UEID may then be associated with the specific type of event at 305 in a centralized UEID storage 135. Specifically, the UEID and the type of event may be correlated in an event node of the centralized UEID storage. As noted above, the centralized UEID storage may be a database, a link list, a hash table, a binary tree, a radix tree or some other form of indexable or orderable storage that may include a plurality of event nodes. The event nodes of the centralized UEID storage may be indexed or searchable by UEID, though in other embodiments the event nodes of the centralized UEID storage may be organized or indexed according to a different algorithm or heuristic.

A callback function may then be identified at 310. Specifically, the callback function may be a callback function of a client module such as client modules 105 or 110. As described above, the callback function may be a function of the client module that should be invoked or executed upon the occurrence of the event associated with the UEID. The callback function may be identified by a client module, the owner module or some other module or processor of the computing device.

The callback function may then be associated with the type of the event of the owner module based on the UEID in the centralized UEID storage at 315. Specifically, the callback function may be indexed in the event node of the type of event of the owner module using the UEID of the type of event of the owner module. By using the UEID of the type of event of the owner module to correlate the callback function with the event node of the type of event in the centralized UEID storage, the callback function may be quickly and easily identified when the type of event of the owner module is identified to have occurred at 320. The identification of the occurrence of the event at 320 may be performed by the owner module or another processor or logical element of the computing device.

Based upon the occurrence of the type of event, the UEID of the type of event of the owner module may be identified by the owner module or one or more other processors or logical elements of the computing device. The callback function identified at 310 may then be identified based on its association with the event node of the type of event of the owner module using the UEID of the type of event. The callback function may therefore be invoked based on the UEID of the type of event of the owner module at 325. As described above, the invocation of the callback function at 325 may include performance of the callback function by the owner module, or the transmission of a notification to the client module that owns the callback function so that the client module may perform the callback function. Alternatively, the callback function may be performed by a separate module, processor or logical element of the computing device.

Figure 4:
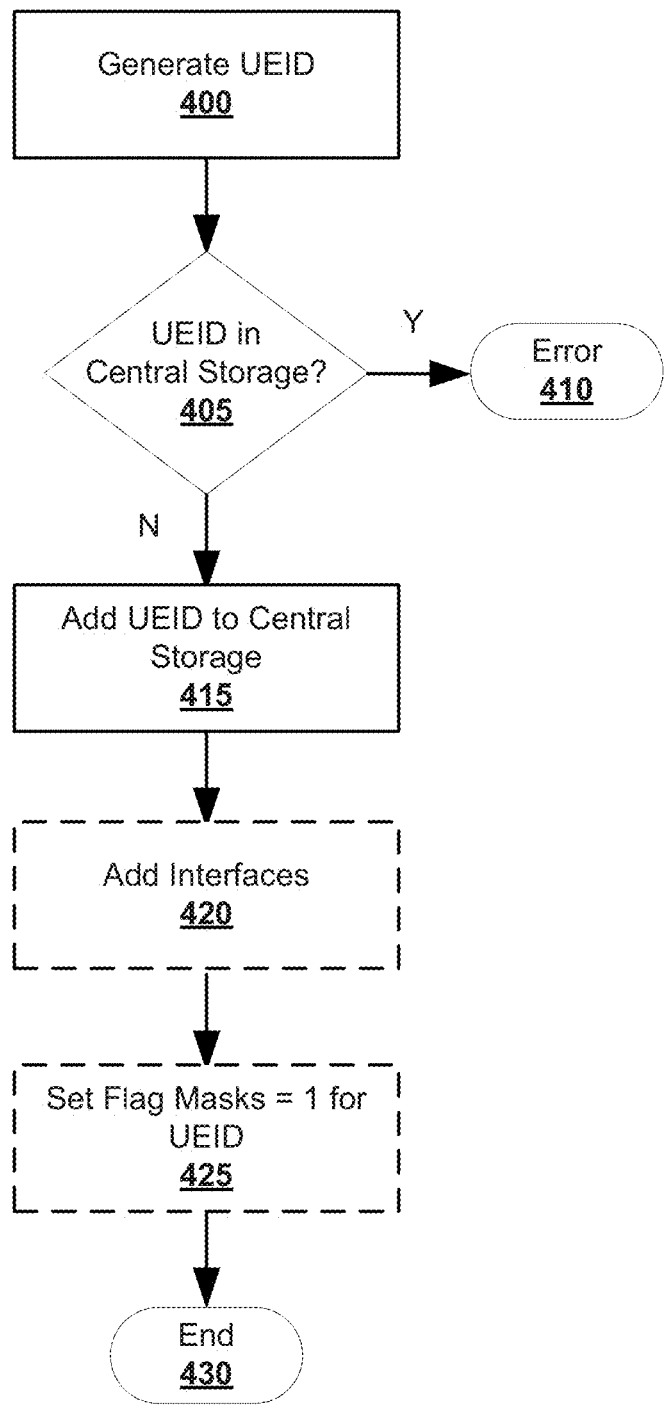
FIG. 4 is a process flow diagram illustrating a process for associating a UEID with a type of an event in a centralized database, in accordance with various embodiments.

FIG. 4 depicts an example process that may provide further details of the generation of a UEID, and may generally correspond to elements 300 and 305 of FIG. 3, in accordance with various embodiments. For the purposes of the discussion of FIGS. 4, 5 and 6, an owner module such as owner module 115 will be described as a non-limiting example display regulator driver. The types of events handled by the owner module may be the electronic paper display power up event, the electronic paper display power down event and the electronic paper display regulator fault events shown in the chart 200 of FIG. 2. As shown in FIG. 2, the types of events may have UEIDs of 0xA01, 0xA02 and 0xA03, respectively.

In FIG. 4, one or more UEIDs may be generated at 400 based on one or more types of events handled by an owner module such as owner module 115. For example, if the owner module is the display regulator driver, then the UEIDs 0xA01, 0XA02 and 0xA02 may be generated at 400. As described above, the UEIDs may include a first portion based on a software event number or IRQ number of the display regulator driver and a second portion based on a bit position of each type of event in an event registry of the display regulator driver. The UEIDs may be generated by the owner module or another processor of the computing device.

A search may then be performed by the owner module or by the another processor of the computing device to determine at 405 whether the UEID(s) already exist and are stored in a centralized UEID storage such as centralized UEID storage 135. Specifically, each event node in the centralized UEID storage may be searched to identify whether the UEID(s) are associated with an event node in the centralized UEID storage. If the UEID(s) already exist, then an error will occur at 410 and the process will end. However, if the UEID(s) do not already exist in the centralized UEID storage, then the UEID(s) may be added to one or more event nodes of the centralized UEID storage at 415. Adding a UEID to the centralized UEID storage at 415 may include associating the UEID with the event node of the type of event of the owner module that the UEID is intended to represent. As described above, the event nodes of the centralized UEID storage may be indexed according to UEID, though in other embodiments the centralized UEID storage may be sorted or indexed according to one or more additional or alternative criteria.

Optionally, one or more interfaces for each UEID may then be added to the event node associated with the UEID by the owner module or the other processor or logical element at 420, and a flag mask of the event node for the UEID may be set equal to 1 by the owner module or other processor or logical element at 425 for each UEID in the centralized UEID storage. In other embodiments, the addition of the interfaces at 420 and the setting of the masks at 425 may not occur. For example, if the computing device or operating system is not highly complex, then the interfaces or masks may not be required. Generally, an interface and mask may be a way to mask or unmask specific types of events for certain situations. Setting the flag mask of the event node equal to one may signal that the type of event is "masked" and the system may not perform any actions in response to the occurrence of the event. For example, if the type of event is "masked" then the owner module may not invoke a callback function associated with the event. By contrast, setting the flag mask of the event node equal to zero may indicate that the system should monitor for the type of event associated with the UEID to be handled by the owner module, and some action such as invoking a callback function may be performed in response to an occurrence of the type of event. An example of when a flag mask of an event node may be set equal to one, indicating the type of event is masked, may occur with respect to a device with a display screen and a cover that may cover the display screen. When the cover of the device is closed, the display screen, and types of events associated with the display screen, may not need to be handled because the display screen may be considered inert or "turned off." Therefore, the types of events associated with the display screen may be masked when the cover of the device is closed. The values one and zero described above are merely examples, and in other embodiments setting the mask equal to zero may indicate that the type of event is masked, and setting the mask equal to one may indicate that the event is unmasked. In FIG. 4, types of events are set as masked by default, although in other embodiments the types of events may have a default setting of being unmasked.

Subsequent to the addition of one or more interfaces for a type of an event at 420 and setting the flag masks at 425, if required, or the addition of the UEID to the centralized UEID storage at 415, the process of generating and registering types of events in the centralized UEID storage may then end at 430.

Figure 5:
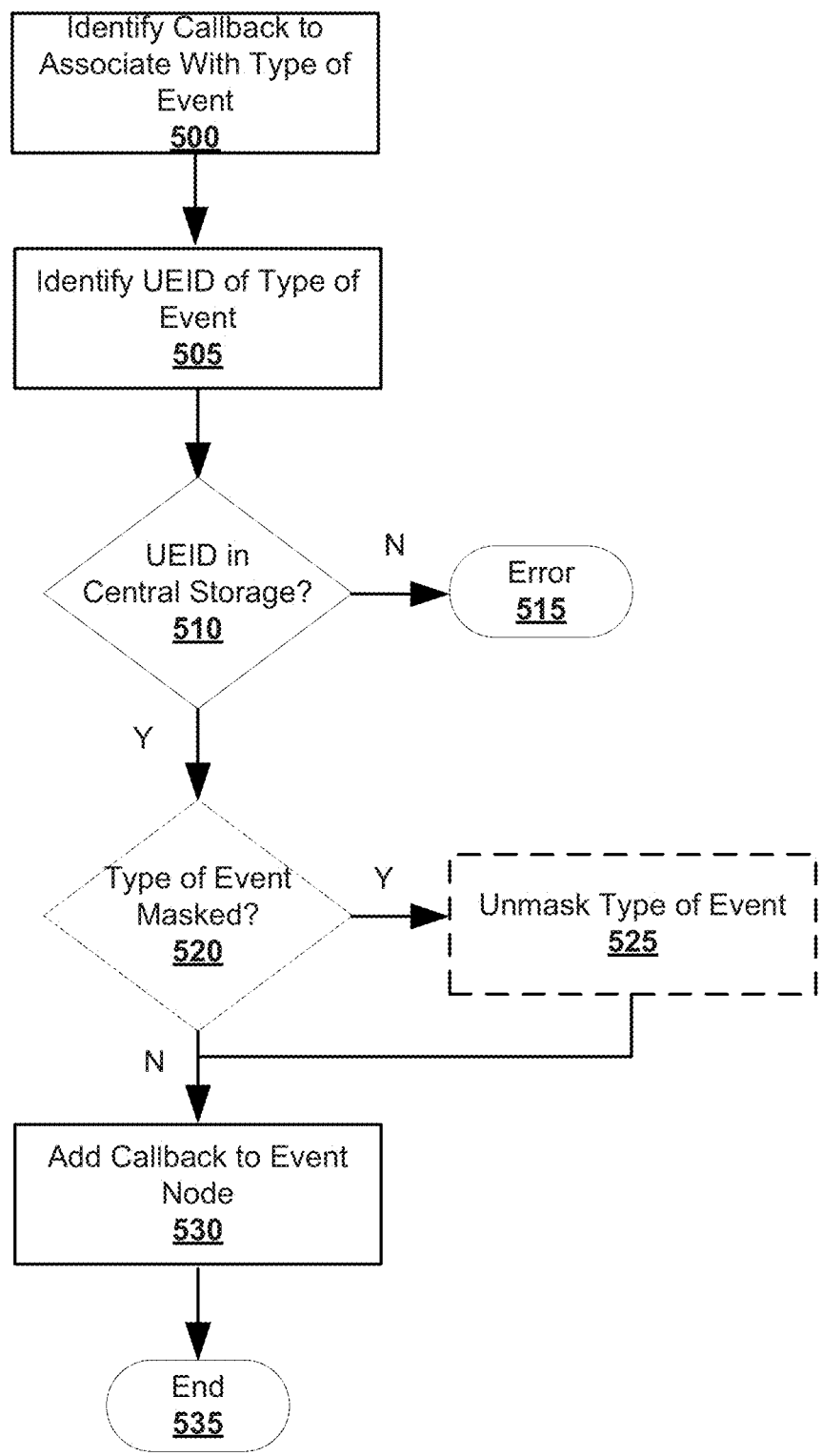
FIG. 5 is a process flow diagram illustrating a process for registering a callback with a type of an event using the UEID, in accordance with various embodiments.

FIG. 5 depicts an example process providing further details of how a callback function may be associated with a type of an event handled by an owner module such as owner module 115 using a UEID of the type of event, and may generally correspond to elements 310 and 315 of FIG. 3, in accordance with various embodiments. Initially, a callback function may be identified at 500 by a client module such as client module 105 or 110. For example, if the owner module is a display regulator driver as described above with respect to FIG. 4, the client module may be a sensor driver configured to operate a sensor of a computing device such as computing device 100, or a network driver configured to operate a network interface of the computing device. The sensor driver may identify, for example, a callback function that should be associated with the electronic paper display power up event or the electronic paper display power down event handled by the display regulator driver. Additionally or alternatively the network driver may wish to associate a callback function with the electronic paper display power down event of the display regulator driver. As described above, associating a callback function with a type of an event may result in the owner module or the client module invoking or performing the callback function upon the owner module handling the event.

The UEID of the owner module type of event that the callback function should be associated with may then be identified at 505. The identification may be performed, for example, by the client module. The client module may be configured to generate the UEID of the type of the event based on information received from the owner module. Alternatively, the client module may be configured to query the owner module regarding a specific type of event and receive, from the owner module, the UEID of the type of event based on an association of the UEID with the type of event in an event node of the centralized UEID storage. In other embodiments, the client module may have one or more other ways or means of identifying the UEID of the type of event of the owner module.

Dependent on how the client module identified the UEID of the type of event handled by the owner module, the client module may then query whether the UEID of the type of event handled by the owner module is associated with an event node in the centralized UEID storage at 510. Specifically, the client module may query whether an event node exists in the centralized UEID storage that includes both a type of an event and the UEID identified at 505. If the UEID of the type of event is not identified in an event node of the centralized UEID storage, then the client module may return an error at 515. Otherwise, the client module may optionally proceed to identify whether the type of event handled by the owner module is masked at 520. This identification at 520 may include querying one or more event nodes of the centralized UEID storage and verifying that the flag mask of the event node associated with the UEID was set to a value of one at, for example, element 425 of the process of FIG. 4. If the flag mask of the event node indicates that the type of event is masked, then the type of event may be unmasked at 525. Specifically, the flag mask of the event node associated with the type of event may be set to an unmasked state, which may be equal to zero. As noted above with respect to elements 420 and 425, in some embodiments masking may not be used. In these embodiments the query at 520 and unmasking at 525 may not be performed and these elements may be considered optional.

If the type of event is not masked at 520, or after the type of event is unmasked at 525, or if masking is not used, then a callback function may be added to the event node based at least in part on the UEID at 530. For example, as discussed above, a callback function of the sensor driver may be associated with the event node of the electronic paper display power up event based on the UEID of the type of event, 0xA01. Additionally, a callback function of the sensor driver may be associated with the event node of the electronic paper display power down event based on the UEID of the type of event, 0xA02. Similarly, a callback function of the network driver may be associated with the event node of the electronic paper display power down event based on the UEID of the type of event, 0xA02. In some cases where multiple callback functions are added to the same event node, for example the event node corresponding to UEID 0xA02, the callback functions may be stored sequentially. That is, when the callback functions of the event node are invoked, the callback functions may be invoked in sequence. In some cases the sequence may be a first in/first out (FIFO) sequence, although in other embodiments the callback functions may be stored or invoked in a different order, or in parallel with one another. It will be understood that the above described modules, callback functions, UEIDs and types of events of the owner module are merely intended as examples, and additional or alternative callback functions, modules, UEIDs or types of events may be used. The process may then end at 535.

Figure 6:
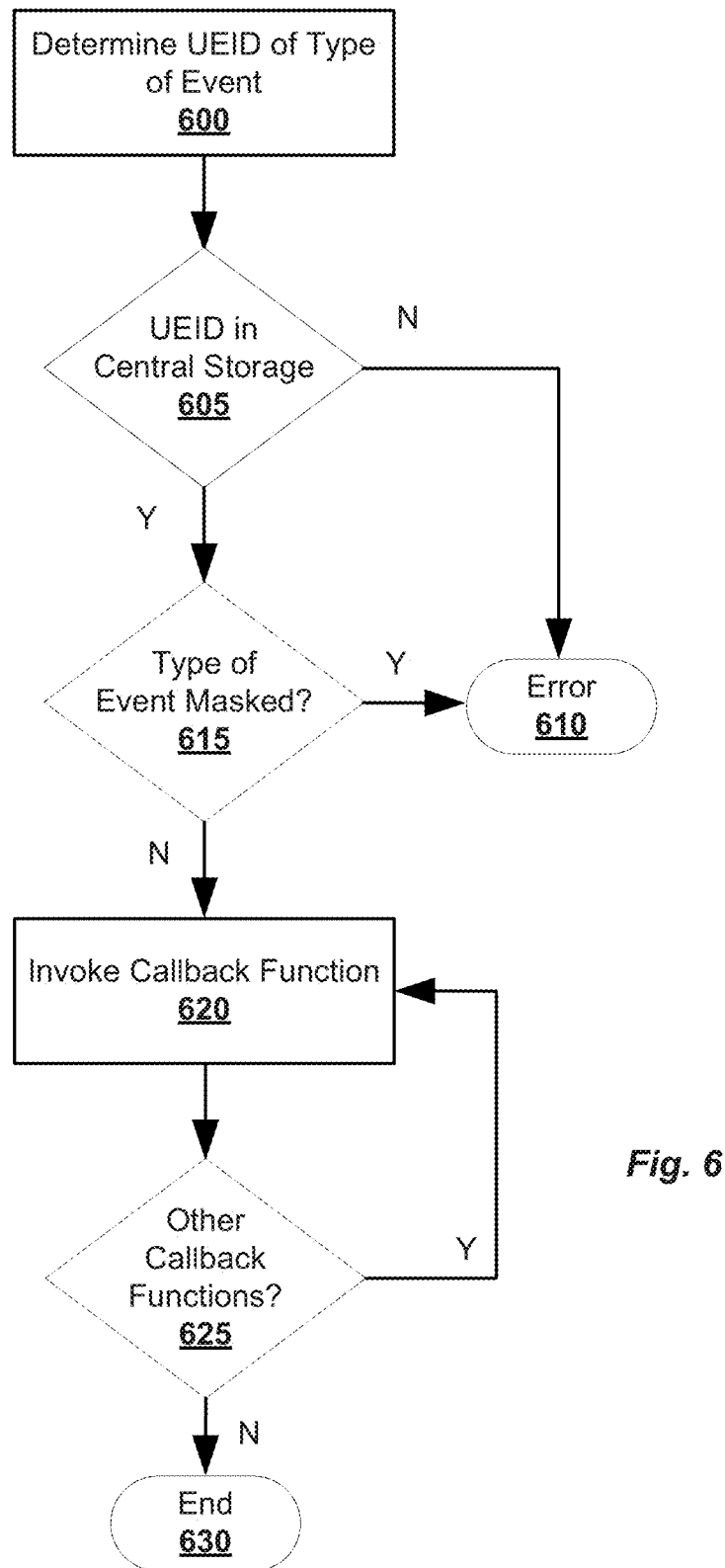
FIG. 6 is a process flow diagram illustrating a process of invoking a callback using a UEID, in accordance with various embodiments.

FIG. 6 depicts an example process providing further details of how a callback function may be invoke based on the handling of an type of event of an owner module such as owner module 115 using a UEID of the type of event, and may generally correspond to elements 320 and 325 of FIG. 3, in accordance with various embodiments. Initially, the type of event may be handled by the owner module, and the UEID of the type of event may be determined at 600. Similarly to element 505 of FIG. 5, the determination of the UEID may be based on independent generation of the UEID, lookup of the UEID or some other type of identification.

A centralized storage such as centralized UEID storage 135 may then be searched at 605 to identify whether the UEID associated with the type of event is in the centralized UEID storage. Specifically, the event nodes of the centralized UEID storage may be searched to identify an event node associated with the UEID and the type of event of the owner module. This search may be performed by an owner module such as owner module 115, or a separate processor of the computing device. If the UEID is not present in the centralized UEID storage, then an error may be returned at 610.

If the UEID is present in the centralized UEID storage, then the owner module or some other processor may search the event node associated with the UEID to identify whether the type of event is masked at 615. Specifically, the owner module may identify according to the flag mask of the event node whether the type of event is masked. If the type of event is marked as masked, for example by having a flag mask value equal to one, then an error may be returned at 610. As described above with respect to elements 420 and 425 of FIG. 4, or elements 520 and 525 of FIG. 5, in some embodiments masking may not be used. Therefore, the search at 615 may be considered optional.

However, if the type of event is not masked, or if no search is performed at 615, then the owner module may invoke one or more of the callback functions associated with the event node. Specifically, the owner module may invoke a first callback function associated with the event node at 620. As described above, invoking a callback function may include performing the callback function by the owner module. Additionally or alternatively, invoking a callback function may include notifying a client module or a separate processor or logical component that the type of event associated with the event node has occurred so that the callback function may be performed by the client module, separate processor or logical component.

As noted above, the callback functions may be stored sequentially in an event node. Therefore, when the owner module invokes callback functions, the callback functions may be performed sequentially. Therefore, after invoking a first callback function at 620, the owner module may identify whether there are other callback functions associated with the owner module that should be invoked at 625. If there are other callback functions that should be invoked, then the owner module may repeat element 620 and invoke one or more additional callback functions. This identification may be repeated until there are no other callback functions to be invoked, and the process may end at 630.

The callback functions may be prioritized based on one or more different elements. For example, the computing device may only have a given amount of time to invoke one or more callback functions associated with the type of event. Therefore, in some cases, if the callback functions are listed sequentially then the first callback function may be performed, then the second, etc. until time runs out, at which point there may be no other callback functions to be invoked. In other embodiments the computing device may only have a limited amount of processing power, and therefore be unable to execute all of the callback functions associated with the owner module. Alternatively, one or more of the callback functions may be masked, and therefore may be skipped instead of invoked at 620. There may be additional/alternative reasons for not invoking one or more other callback functions.

As described above, the processes of FIGS. 3, 4, 5 and 6 may provide several advantages. For example, by associating a type of an event with a UEID in an event node, the occurrence of the type of event may be easily tracked. Tracking these occurrences of types of events may be useful for troubleshooting by programmers such as identification of bottlenecks in the programming. Alternatively, the occurrence of types of events at a greater than expected rate may be useful for identifying marketing potential or areas for further research into user behaviors.

Figure 7:
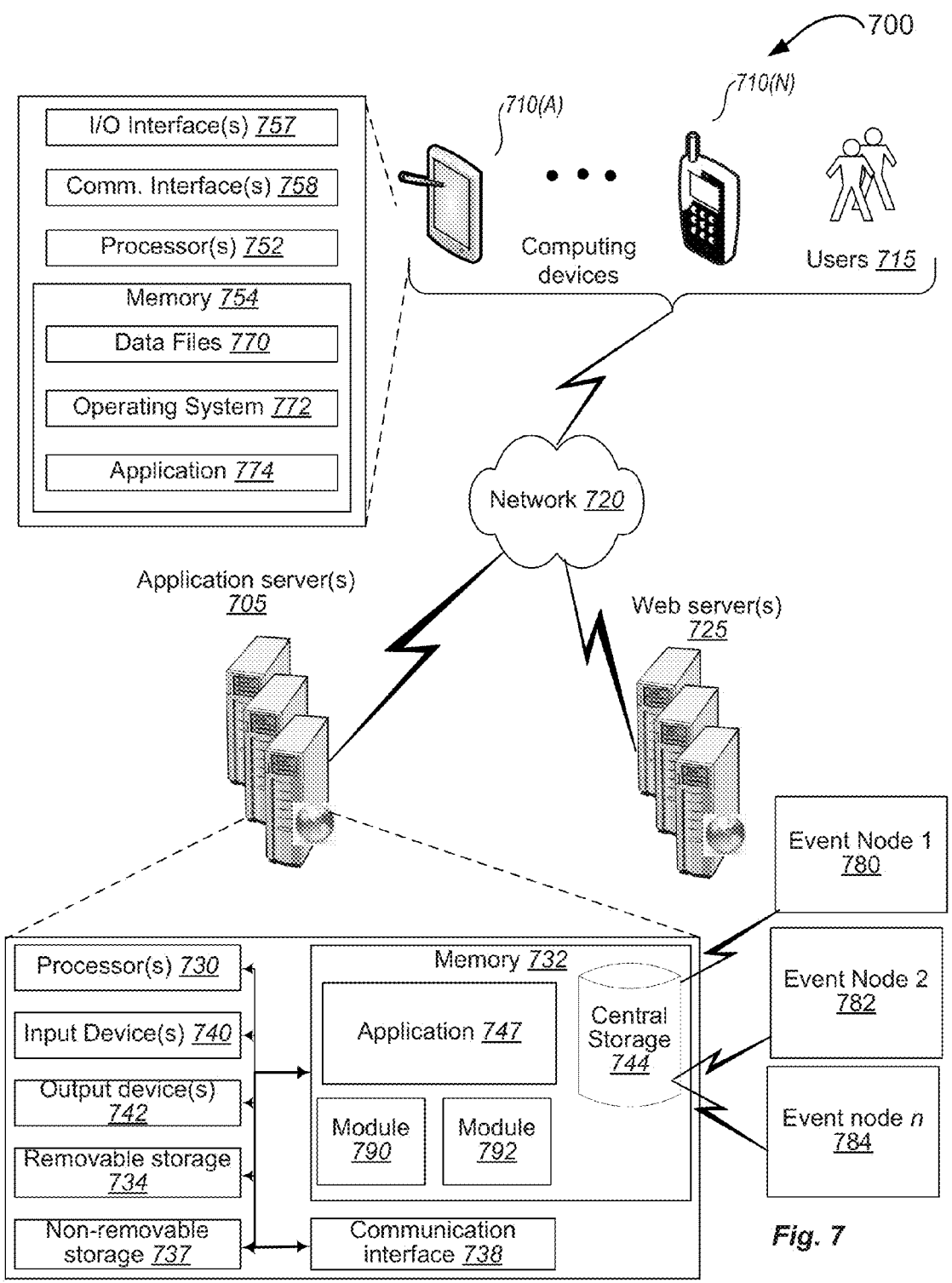
FIG. 7 illustrates an example computing environment in which embodiments described in the present disclosure may be implemented.

FIG. 7 illustrates an example of an illustrative computing environment 700 for implementing aspects in accordance with various embodiments described herein. As will be appreciated, although a Web-based environment is used for purposes of explanation, different environments may be used, as appropriate, to implement various embodiments. The illustrative computing environment 700 may include one or more electronic computing devices 710(A)-710(N), which may include any appropriate device operable to send and receive requests, messages or information over an appropriate network 720 and receive information back as described in greater detail in reference to the computing device 100 of FIG. 1. Examples of such computing devices may include personal computers, smartphones, cell phones, handheld messaging devices, laptop computers, set-top boxes, personal data assistants, electronic book readers, tablets computers and the like.

The computing devices 710(A)-710(N) may include a processor 752 and memory 754 for storing processor-executable instructions, such as data files 770, operating system 772 and one or more applications 774. The operating system 772 may be a general purpose operating system such as a Microsoft Windows® operating system, a UNIX® operating system, a Linux® operating system or an operating system specifically written for and tailored to the computing devices 710(A)-710 (N).

The computing devices 710(A)-710(N) may further include at least one or both of the following elements: input/output interface 757 and communication interface 758. The communication interface 758 may enable the computing devices 710(A)-710(N) to communicate data, control signals, data requests and other information with other resources including computers, data sources, storage devices and the like, on the appropriate computer network 720 such as the Internet, via wired or wireless connections. The input/output interface 757 may enable the computing devices 710(A)-710 (N) to obtain data input from a variety of devices including, but not limited to, a digital pen, a touch screen, a keyboard, a mouse, a scanner and the like. In addition to the illustrative components described above, a display interface (not shown) may be used for outputting display information to a computer user 715. Typically, the display information may be outputted by the display interface via a display device (e.g., a CRT monitor, an LCD screen, a touch screen, a television, an integrated screen or sets of screens, etc.).

The network 720 may include any appropriate network, including an intranet, the Internet, a cellular network, a local area network, a personal network or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof.

The memory 754 may generally comprise RAM, ROM and/or other permanent memory. Thus, in addition to storage in read/write memory (RAM), programming instructions may also be embodied in read-only format, such as those found in ROM or other permanent memory.

The illustrative computing environment 700 may include at least one application server 705 including, or associated with, one or more processors 730, input devices 740, output devices 742, removable storage 734 and non-removable storage 737 that may be connected to a communication interface 738 and memory 732. The memory 732 may include, but is not limited to, one or more applications 747.

The memory 732 may further include a centralized UEID storage 744 configured to store one or more event nodes 780, 782 and 784. As used herein, the centralized UEID storage 744 any device or combination of devices capable of storing, accessing and retrieving data, which may include any combination and number of data servers, databases, data storage devices and data storage media, in any standard, distributed or clustered environment. It should be understood that there may be many other aspects that may need to be stored in the memory 732, such as user access right information, which may be stored in any of the above-listed mechanisms as appropriate.

The memory 732 may further include, or be coupled with, one or more modules 790 and 792 which may correspond, for example, to owner module 115 or client modules 105 and 110, incorporated with the UEID features of the present disclosure, as described above.

The application server 705 may include any appropriate hardware and software for integrating with the centralized UEID storage 744 as needed to execute aspects of one or more applications for the computing devices 710(A)-710(N), handling a majority of the data access and business logic for an application. The application server 705 may provide access control services in cooperation with the centralized UEID storage 744, and is able to generate content such as text, graphics, audio and/or video to be transferred to a viewer, which may be served to the viewer by a Web server 725 in the form of HTML, XML or another appropriate structured language in this example. The handling of all requests and responses, (e.g., requests for item information and the information provided in response) as well as the delivery of content between the computing devices 710(A)-710(N) and the application server 705 may be handled by the Web server 725.

It should be understood that the Web and application servers 705 and 725 are not required and are merely example components, as the applications and software components discussed herein may be executed on any appropriate device or host machine as described elsewhere herein. Each server 705 or 725 may include an operating system that may provide executable program instructions for the general administration and operation of that server, and may include a computer-readable medium storing instructions that, when executed by a processor (e.g., 730) of the server, may allow the server to perform its intended functions. Suitable implementations for the operating system and general functionality of the servers are known or commercially available, and are readily implemented by persons having ordinary skill in the art, particularly in light of the disclosure herein.

The illustrative computing environment 700 may include a distributed computing environment utilizing several computer systems and components that may be interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the illustrative computing environment 700 in FIG. 7 should be taken as being illustrative in nature, and not limited to the scope of the disclosure. In embodiments one or more of the computing devices 710A or 710N may include or be directly coupled with a memory such as memory 732 that may include one or more modules 790 and 792 and/or the centralized UEID storage 744.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. A computer-implemented method comprising:
identifying, by an owner module, an interrupt request (IRQ) number or a software event number of a type of an event;
identifying, by the owner module, a bit position of the type of event in a bit register corresponding to the event;
generating, by the owner module, a first UEID of the type of event by combining the IRQ number or the software event number as a first value in a sequential value associated with the UEID and the bit position of the type of event as a second value in the sequential value associated with the UEID;
associating, by the owner module, the first UEID with an event node that corresponds to the type of event, wherein the event node is part of a plurality of event nodes stored in a centralized storage, and each event node in the plurality of event nodes includes a respective UEID associated with a different type of event;
identifying, by a client module, a callback function to be executed upon occurrence of the type of event;
generating, by the client module, association information associating the callback function with the event node;
causing storage of the association information in the centralized storage;
receiving, by the owner module, a notification of the occurrence of the type of event;
generating, by the owner module, a second UEID for the type of event, the second UEID being numerically identical to the first UEID;
identifying, by the owner module and based at least in part on the second UEID, the callback function corresponding to the type of event; and
invoking, by the owner module, the callback function.

2. The method of claim 1, further comprising associating by the owner module, a mask with the type of event, the mask configured to identify whether the type of event is in a masked state or an unmasked state, the masked state indicating that the owner module will not invoke the callback function in response to an occurrence of the type of event, and the unmasked state indicating that the owner module will invoke the callback function in response to an occurrence of the type of event.

3. The method of claim 2, wherein a value of "1" for the mask indicates that the type of event is in the masked state and a value of "0" for the mask indicates that the type of event is in the unmasked state and wherein the method further comprises:
   determining, by the client module that the type of event is in the masked state; and
   changing, by the client module, the value of the mask in the event node to "0".

4. A computer-implemented method comprising:
   identifying, by a client module a unique event identifier (UEID) corresponding to a type of an event, the UEID including (i) a first part related to one of: an interrupt request (IRQ) or a software event number of the type of event, and (ii) a second part related to a bit position of the type of event in an event registry; and
   generating, by the client module and based at least in part on the UEID, association information associating a callback function with the type of event.

5. The method of claim 4, further comprising:
   receiving, by the client module from an owner module, a notification of an occurrence of the type of event; and
   executing, by the client module and based at least in part on the occurrence of the type of event, the callback function.

6. The method of claim 4, further comprising:
   identifying, by the client module and based at least in part on the UEID, that the type of event is in a masked state based at least in part on a value of a flag mask associated with the type of event; and
   changing, by the client module, the value of the flag mask to place the type of event in an unmasked state.

7. The method of claim 4, wherein the UEID is a 16-bit number, a 32-bit number, or a 64-bit number.

8. The method of claim 4, further comprising storing the association information in a centralized storage.

9. The method of claim 8, wherein the centralized storage is a binary tree, a radix tree, a hash table or a database.

10. The method of claim 4, wherein the centralized storage includes an event node that corresponds to the type of event, wherein the event node is part of a plurality of event nodes stored in the centralized storage and respective event nodes in the plurality of event nodes are configured to store respective UEIDs with respective types of events.

11. An apparatus comprising:
   a processor;
   an owner module coupled with the processor, the owner module configured to generate a unique event identifier (UEID) corresponding to a type of an event, wherein the UEID includes a first portion related to an interrupt request (IRQ) or a software event number of the type of event, and wherein the UEID further includes a second portion related to a bit position of the type of event in an event registry of the owner module; and
   a centralized storage coupled with the owner module, wherein the centralized storage includes:
      first association information indicative of an association between the UEID and an event node, wherein the event node corresponds to the type of event; and
      second association information indicative of an association between a callback function and the UEID.

12. The apparatus of claim 11, wherein the owner module is further configured to:
   determine that the type of event has occurred;
   identify, using the UEID and the second association information, the callback function associated with the type event; and
   invoke the callback function.

13. The apparatus of claim 11, wherein the callback function is a callback function of a client module.

14. The apparatus of claim 11, wherein the UEID is a 16-bit number, a 32-bit number, or a 64-bit number.

15. The apparatus of claim 11, wherein the centralized storage is a binary tree, a radix tree, a hash table or a database.

16. The apparatus of claim 11, wherein the event node is one of a plurality of event nodes stored in the centralized storage and respective event nodes in the plurality of event nodes are configured to store respective UEIDs with respective types of events.

17. The apparatus of claim 16, wherein the event node further includes a flag mask indicating whether the type of event is masked.

18. The apparatus of claim 17, wherein the owner module is configured to not invoke the callback function in response to an occurrence of the type of event, if the type of event is masked.

19. The apparatus of claim 11, wherein the UEID is a first UEID and the owner module is further configured to:
   receive a notification of an occurrence of the type of event; and
   generate a second UEID for the type of event, the second UEID being identical to the first UEID.

20. The apparatus of claim 19, wherein the second UEID is based at least in part on the IRQ or the software event number of the type of event, and the bit position of the type of event in the event registry of the owner module.

* * * * *